(12) United States Patent
Rutherford

(10) Patent No.: US 11,530,786 B2
(45) Date of Patent: Dec. 20, 2022

(54) LIGHTING APPARATUS AND METHOD FOR APPLICATION OF WINDOW TINT TO AUTOMOBILES

(71) Applicant: Lorin Jeffrey Rutherford, Orange Park, FL (US)

(72) Inventor: Lorin Jeffrey Rutherford, Orange Park, FL (US)

(*) Notice: Subject to any disclaimer, the term of this patent is extended or adjusted under 35 U.S.C. 154(b) by 0 days.

(21) Appl. No.: 17/059,011

(22) PCT Filed: May 25, 2019

(86) PCT No.: PCT/US2019/034079
§ 371 (c)(1),
(2) Date: Nov. 25, 2020

(87) PCT Pub. No.: WO2019/227089
PCT Pub. Date: Nov. 28, 2019

(65) Prior Publication Data
US 2021/0207780 A1 Jul. 8, 2021

Related U.S. Application Data

(60) Provisional application No. 62/676,732, filed on May 25, 2018.

(51) Int. Cl.
| | | |
|---|---|---|
| *F21S 4/22* | (2016.01) | |
| *B60Q 3/88* | (2017.01) | |
| *B60J 3/00* | (2006.01) | |
| *F21S 9/02* | (2006.01) | |
| *F21V 23/06* | (2006.01) | |
| *F21Y 115/10* | (2016.01) | |

(52) U.S. Cl.
CPC .............. *F21S 4/22* (2016.01); *B60J 3/007* (2013.01); *B60Q 3/88* (2017.02); *F21S 9/02* (2013.01); *F21V 23/06* (2013.01); *F21Y 2115/10* (2016.08)

(58) Field of Classification Search
CPC ....... F21S 4/22; F21S 9/02; B60Q 3/88; B60J 3/007; F21V 23/06
See application file for complete search history.

(56) References Cited

U.S. PATENT DOCUMENTS 5,803,577 A * 9/1998 Stratton .............. B60Q 1/2615
 362/223
2010/0048097 A1* 2/2010 Ma ........................ A63H 33/22
 446/473

* cited by examiner

*Primary Examiner* — Thomas M Sember
(74) *Attorney, Agent, or Firm* — Steven R. Scott

(57) ABSTRACT

A lighting apparatus formed from a translucent cylindrical foam tube such as a white "pool noodle" that is soft, flexible, and resilient and has a flexible electrically powered internal illumination source such as an LED strip bearing multiple LEDs extending through its interior. The lighting apparatus is typically provided with electricity via a plug adapted for insertion into an automobile cigarette lighter socket, and is readily positioned along the interior edges of an automobile window for illumination of areas where window tint/film is being applied to the window. The lighting apparatus can also have a self-contained power source and be connected in series for added versatility and utility.

20 Claims, 9 Drawing Sheets

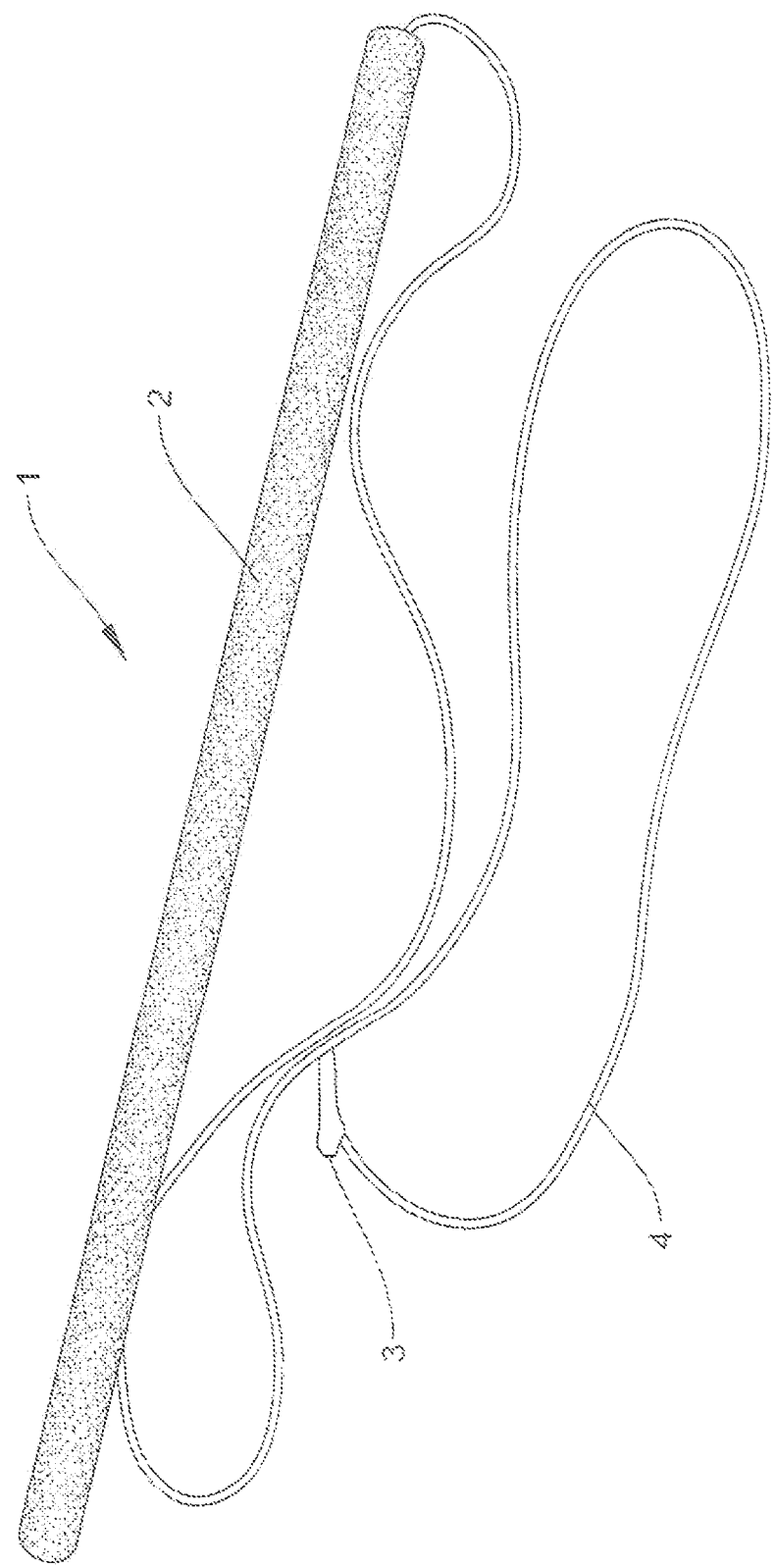

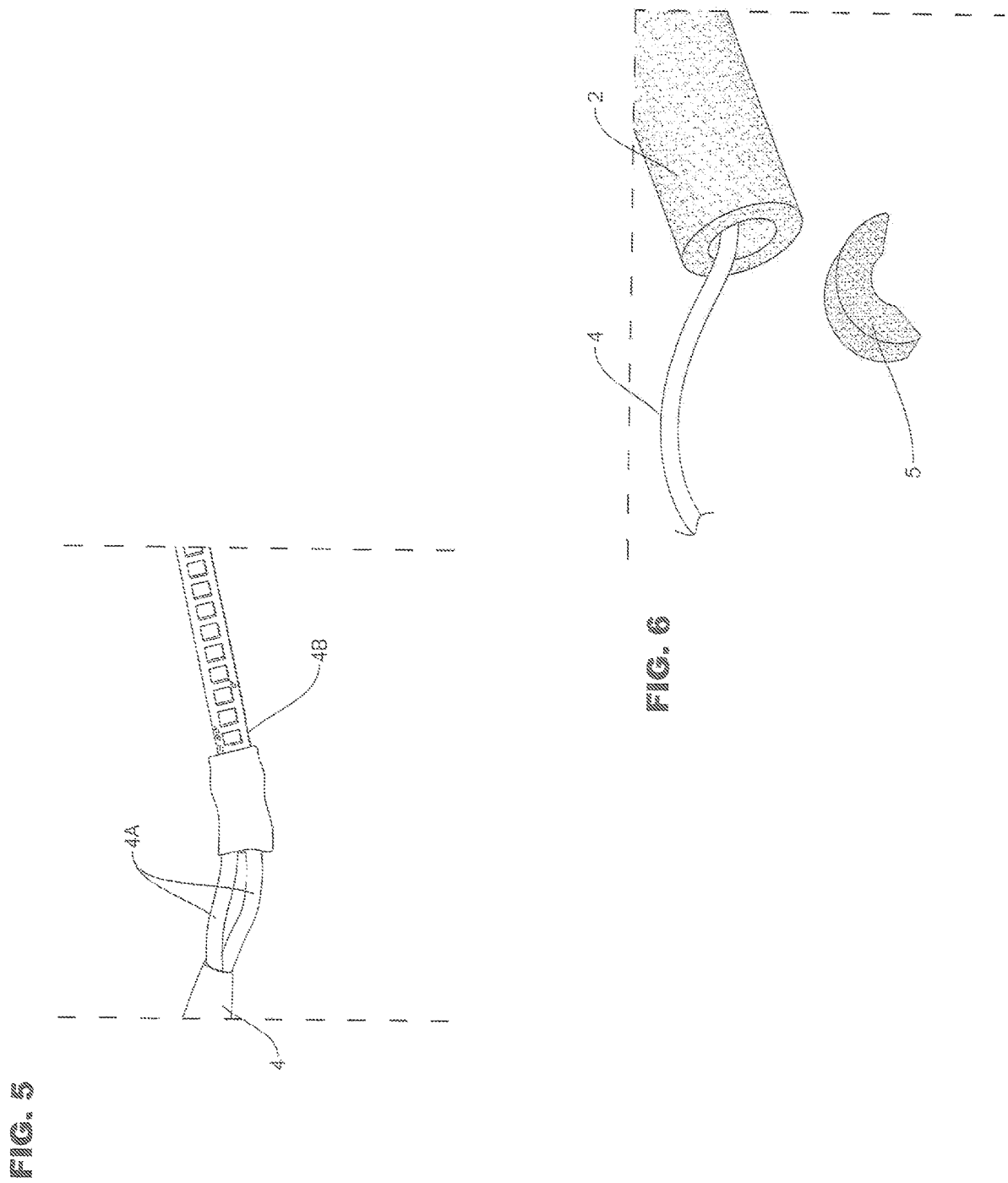

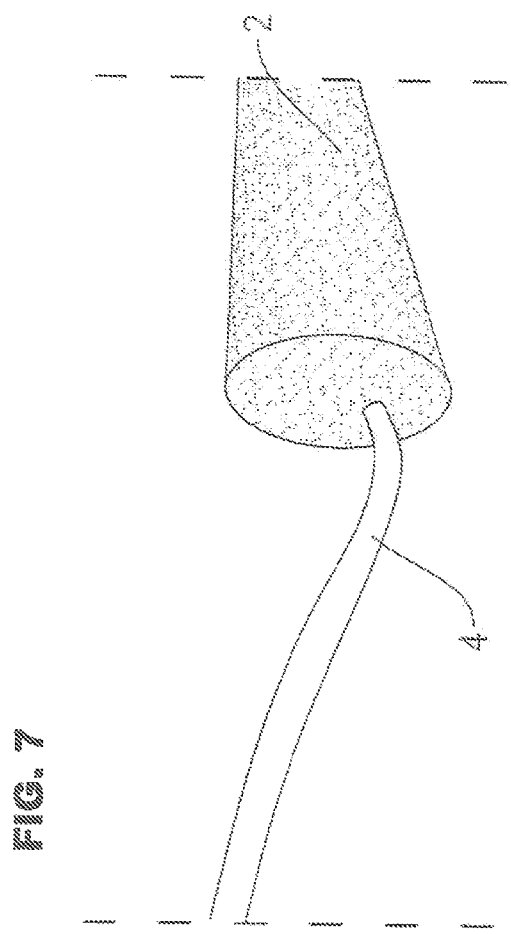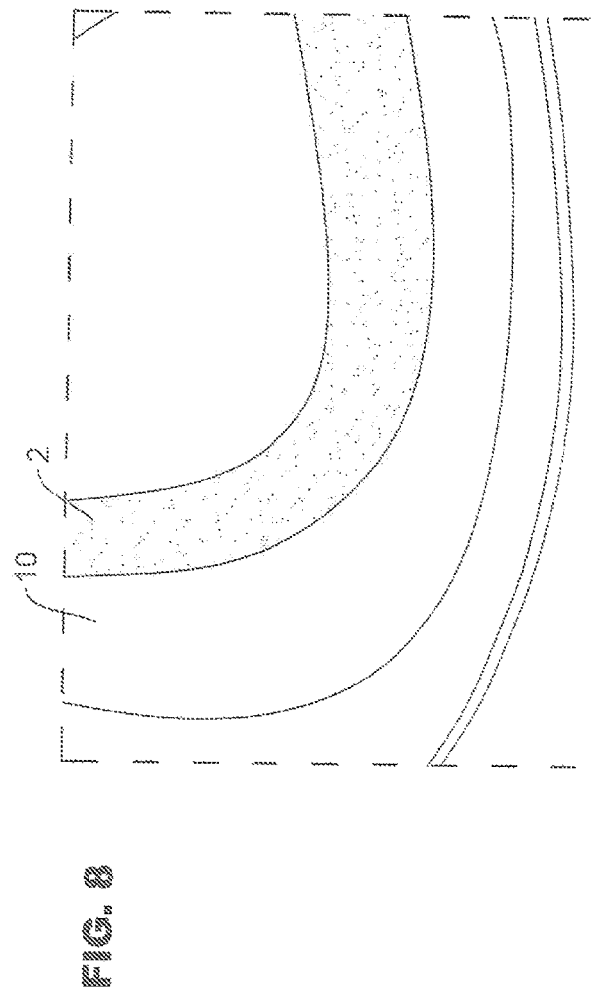

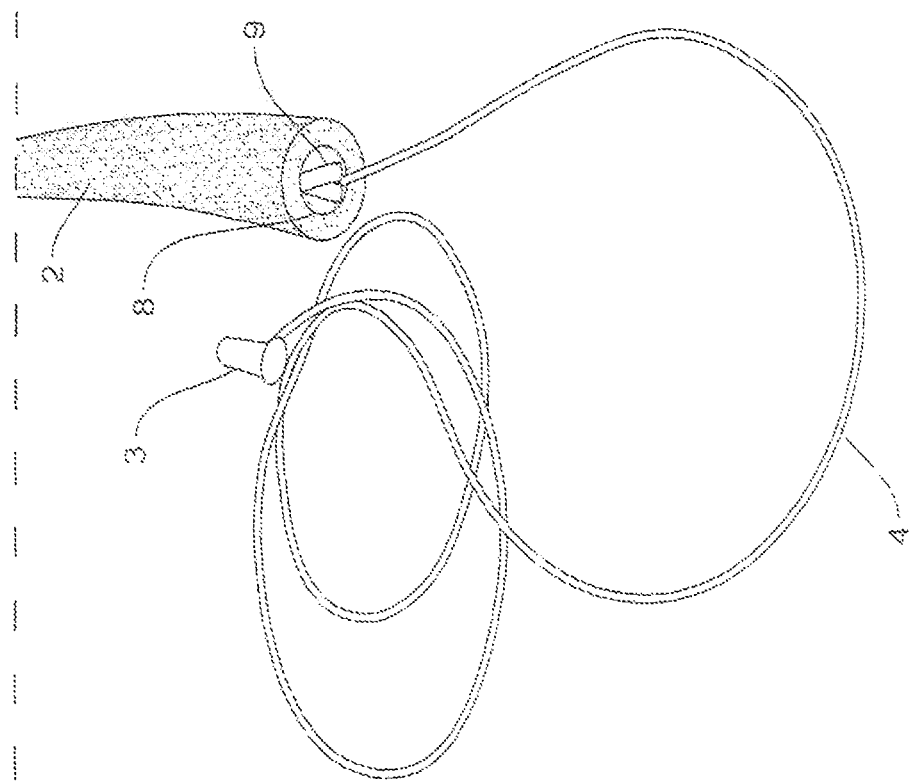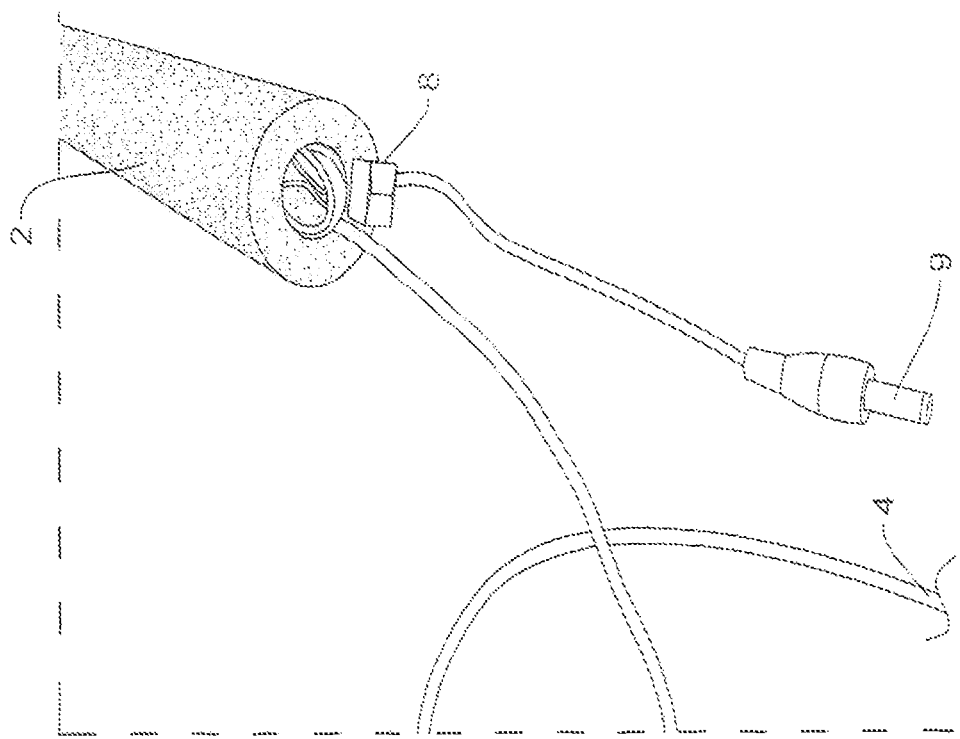

LIGHTING APPARATUS AND METHOD FOR APPLICATION OF WINDOW TINT TO AUTOMOBILES

CROSS-REFERENCE TO RELATED APPLICATIONS

This application claims the benefit and priority of U.S. Provisional Application Ser. No. 62/676,732 titled "Lighting Apparatus and Method for Application of Window Tint in Automobiles" filed May 25, 2018, the same being incorporated herein by reference.

BACKGROUND AND SUMMARY

This invention pertains generally to the field of window tinting by application of window film. More particularly, this invention describes an improved lighting source and method for use in application of film for window tinting in automobiles and/or other vehicles.

Window film for tinting purposes in automobiles and for similar uses is generally comprised of a thin laminate film that can be installed to the exterior of glass surfaces in automobiles and the like. It is typically formed from Polyethylene Terephthalate (PET), a thermoplastic polymer resin of the polyester family. (PET is particularly desirable due to its clarity, tensile strength, dimensional stability, and ability to accept a variety of surface-applied or embedded treatments). Such films can be categorized in several ways. In terms of their construction components, they can be dyed, pigmented, metallized, ceramic or nano. In terms of their intended use, they can be categorized as automotive, marine, or architectural. Alternately, they can also be classed by substrate type, such as glass or polycarbonate, and/or by their technical performance, such as privacy, solar control, safety and security.

However, in the categories of interest to the instant invention, for automotive windows and the like, they can all uniformly be categorized as difficult to apply. In general, the craftsmen who apply window tint are required to precisely position and delicately cut out the window shape/pattern against the outside of the prospective automotive window glass. For this purpose, an adequate light source of some type is imperative and is generally positioned adjacent the location where work is being done on the inside of the window glass to properly illuminate and facilitate the work being performed. Unfortunately, inadequate and/or improper lighting behind the window glass makes the tint and window edges difficult to see during this cutting and fitting process, rendering the process very difficult and sometimes impossible to perform properly. In addition, typical lighting devices are difficult to maneuver for focusing light to specific areas, meaning the light source is constantly being adjusted on the interior of the vehicle while the film is cut on the exterior of the vehicle. Furthermore, typical lighting sources are hard to the touch and inflexible, making them unfavorable when working with glass; a highly fragile material.

In order to overcome the limitations of the prior art and better serve the needs of the automobile window tinting industry, the instant invention provides an improved lighting source comprising a long, white, translucent cylindrical foam tube that is soft, flexible and resilient as well as being illuminated from within. Given these qualities, it is provides a source of lighting capable of being shaped or molded to the interior window frame of any vehicle and cannot damage window glass. Thus, it is capable of wrapping around and illuminating curved areas at corners of the window as well as along straight edges. However, the size, shape and resilience of the product causes it to be inflexible enough as to put pressure against the window frame to hold it in place without further need of attachment, and without causing any damage to the vehicle. The cylindrical foam tube is illuminated via an LED light strip on the inside causing the translucent white foam tube to glow brightly behind the window film, thus allowing the craftsman applying window tint greater ability to see the edges of the glass during the window pattern cutting process from the exterior of the vehicle. The tube in question is advantageously formed from a white hollow tube of flexible, resilient, buoyant polyethylene foam of the type commonly referred to as a "pool noodle". A tube of this material has been found to scatter and diffuse the light of an enclosed LED light strip so as to create an even and clear lighting source and also to pad and shield both the light strip and window from damage.

The LED light strip is primarily powered in one of two ways. As most vehicles are pre-equipped with both cigarette lighter and/or at least one 12-volt outlet which takes a male plug in a female receptacle, the first way is to plug into the cigarette lighter having a male to female receptacle with a positive and negative lead which connects by long wire. One end plugs into either a cigarette lighter, or a 12-volt outlet, the opposing end connecting to the LED light strand which would run the full length of the tube, each end having foam caps/plugs to keep the LED strand safely in position from any tugging and/or pulling at the cord. In addition, a preferred embodiment of the invention has a female receptacle for the male plug at its the opposite end of the foam tube, allowing the illumination tubes of the invention to be connected in series ("daisy chained") and for more than one tube to receive power from the same outlet. The second way to power my invention is through the utilization of a battery pack (which is preferably rechargeable). Such a 12 volt 5-10 amp battery pack can be external to the tube of the invention, or located internally at one end of the cylindrical white tubing with a short internal wire connecting to the LED so that both lighting and power sources are inside of the cylindrical foam tubing of my invention.

BRIEF DESCRIPTION OF THE DRAWINGS

FIGS. 1 through 2B provide introductory schematic views of a basic embodiment of my invention. FIG. 1 provides a basic schematic view of the invention's exterior. FIG. 2B provides further detail with regard to the use of "zip ties" as an advantageously used mechanism for spacing and retention of the LED strip of the invention in position.

FIGS. 3, 4, 5, 6, and 7 provide a generally sequential schematic view of the manner in which the LED strip of the invention is connected to the cord/plug combination of the invention and placed in the tube of the invention.

FIGS. 8, 9, and 10 provide illustrative examples of the manner in which the invention can be bent and placed for illumination purposes on the interior of vehicle windows.

FIGS. 13 and 14 provide, respectively, partially assembled and fully assembled views of the end features of an embodiment of the invention adapted for both connection to an external battery pack and plugging into a standard source of power.

DESCRIPTION

Figure 2B:
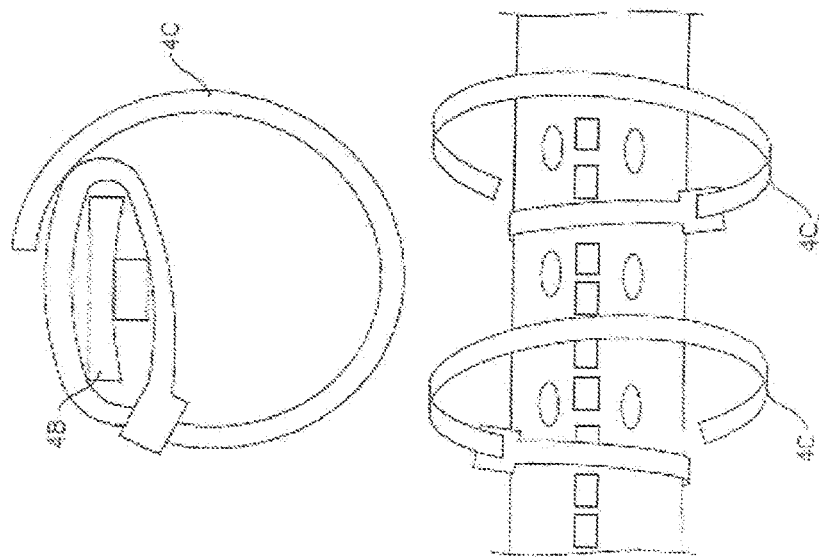
Figure 2A:
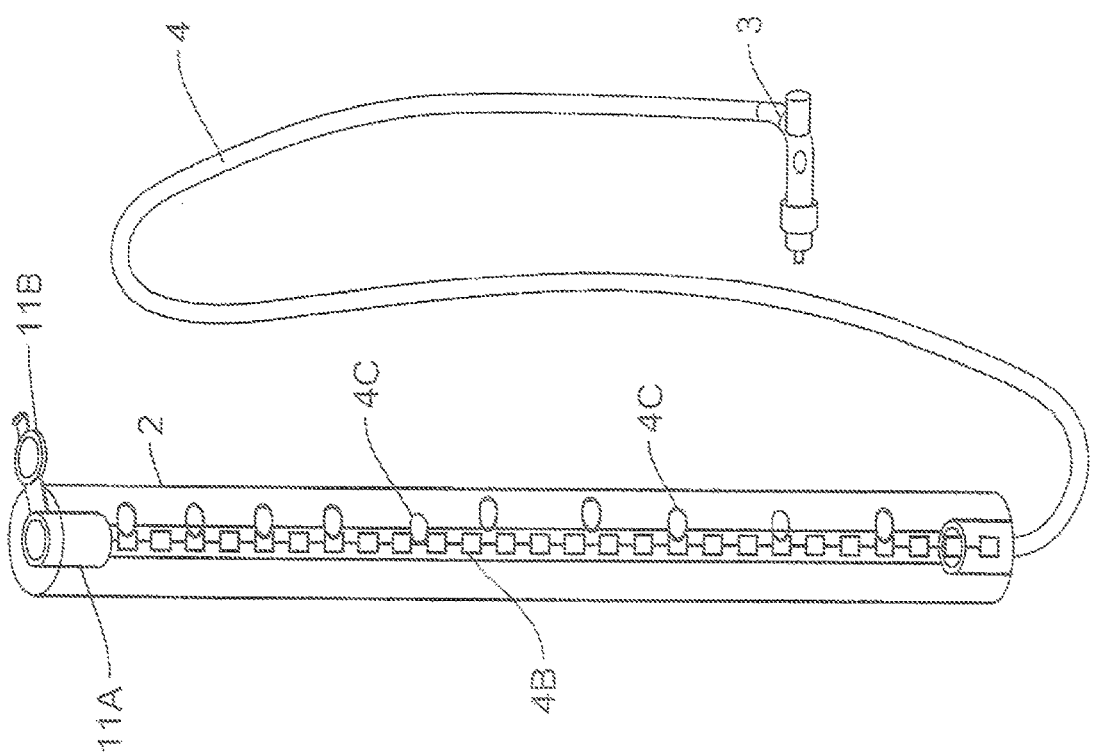
FIG. 2A schematically shows certain internal as well as external features of the invention.
Figure 3:
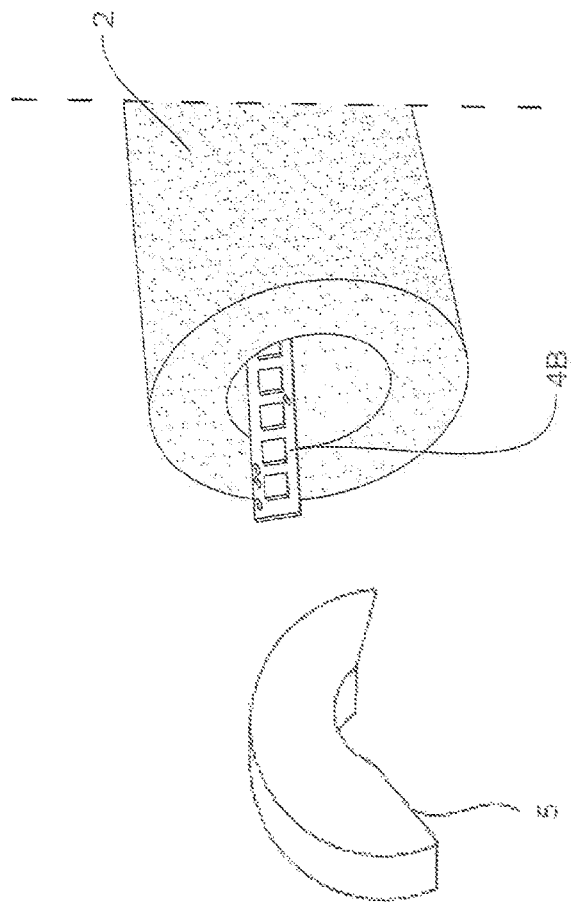
Figure 4:
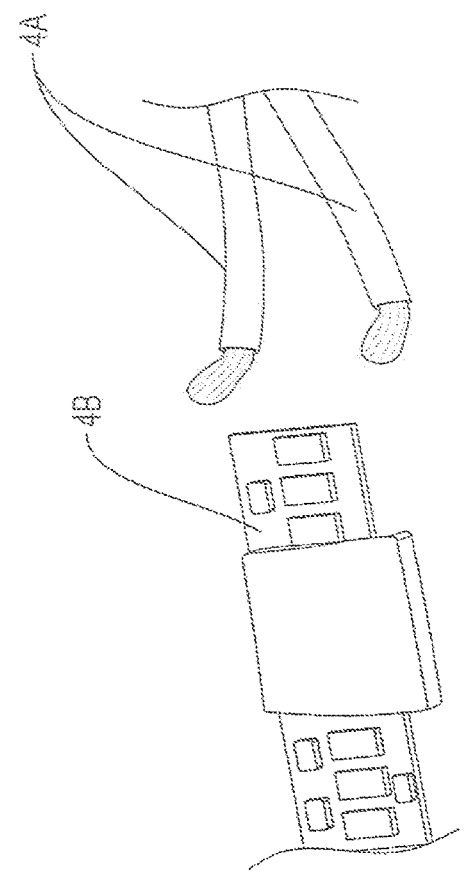

FIGS. 1 through 7 illustrate the primary components of the apparatus 1 of my invention, including partially exploded views in which internal parts (normally hidden by cylindrical foam tube 2) are also shown. These include (as seen in FIGS. 1 and 2) a 12-volt plug 3 which supplies power to long wire 4. As shown in FIGS. 3 through 5, Wire 4 includes positive and negative leads 4A by which it is connected to a diode/LED strip 4B running the length of tube 2 that lights up when plug 3 is plugged into a 12-volt socket/cigarette lighter of a vehicle. A foam plug/cap 5 at each end seals the ends of the tube 2 off from dirt and dust particles, as well as serving to hold the LED strip 4 in place. In order to anchor the LED strip 4 in place connected to the plug/cap 5, a push pin can be inserted through the plug/cap 5 and the LED strip 4 secured thereto via marine heat shrink material and glue.

Figure 10:
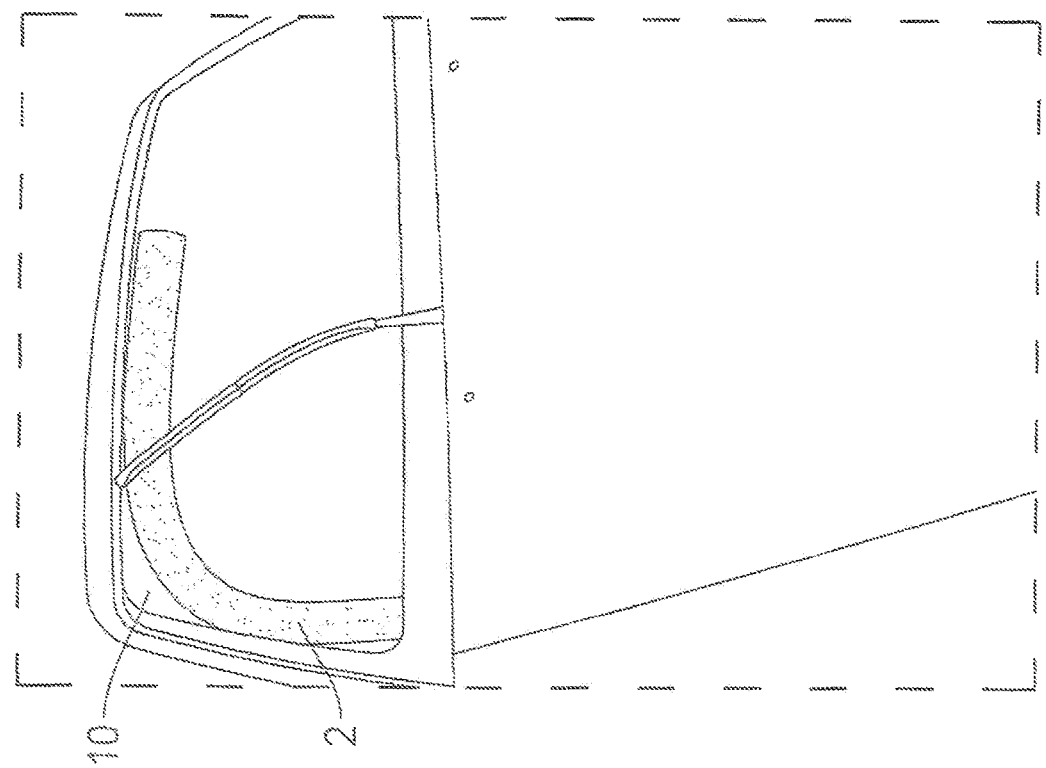
Figure 9:
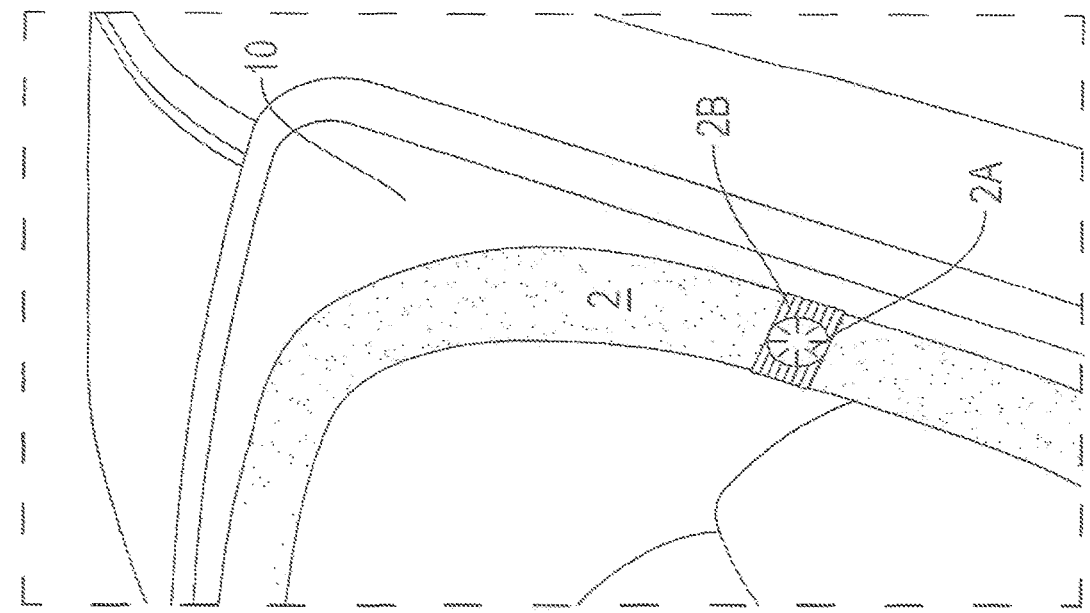

As best illustrated in FIGS. 8 through 10, the LED light tube 2 of the invention 1 is made of soft, flexible foam material designed to conform to the interior frame of automobile windows 10 by utilization of a constant force of memory foam pressure making this product a favorable light source when working with highly fragile materials. The LED light strip 4B glows from the interior of the foam 2, which diffuses and scatters it to provide a strong glare-free source of illumination. In addition, foam tube 2 not only pads and protects LED light strip 4B from damage, it provides a soft, safe and flexible light source that can be easily positioned on the inside of an automobile's window glass 10, to better illuminate the exterior edges of the window 10. Further, as illustrated in FIG. 10, secure placement and retention of the invention in a desired position can easily facilitated by the use of retainers 2A. These can be suction cups and/or magnets, with the former being directly attachable to the window, and the magnets used for attachment to the metal window frame. Retainers 2A are attached to (and held in place on) tube 2 by, e.g., velcro retainer straps 2B. This greatly improving upon existing lighting options so that window tinters are better able to see the curves and edges of the window glass 10 through the darker window films being cut/trimmed during the window pattern film cutting process, safely, and with minimal adjustment to the lighting source (tube 2).

Figure 11:
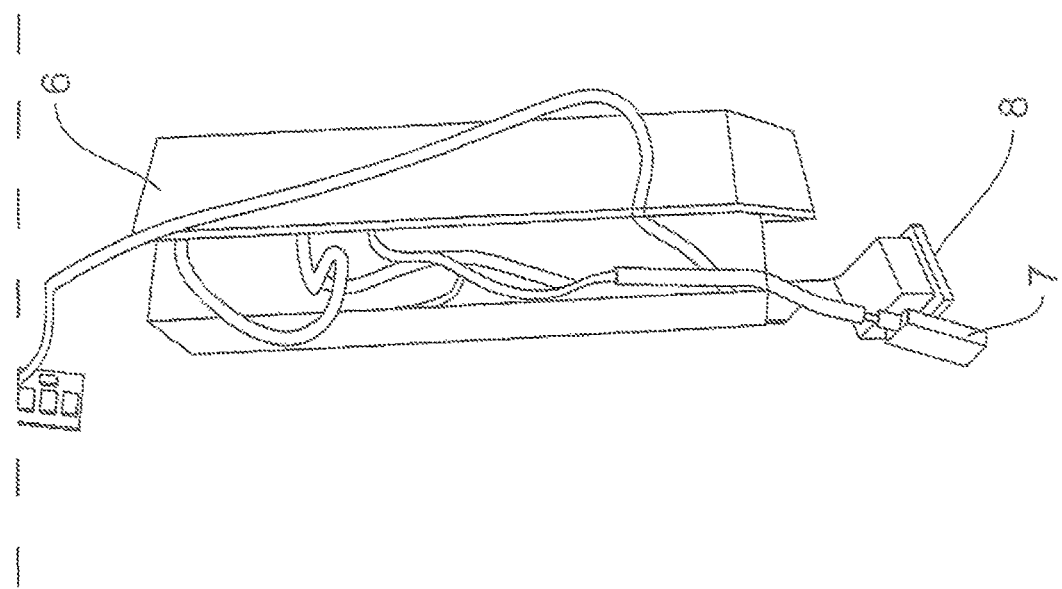
FIGS. 11 and 12 provide views of, respectively, an internal battery pack for use with the invention and the end features of an embodiment of the invention containing said battery pack.
Figure 12:
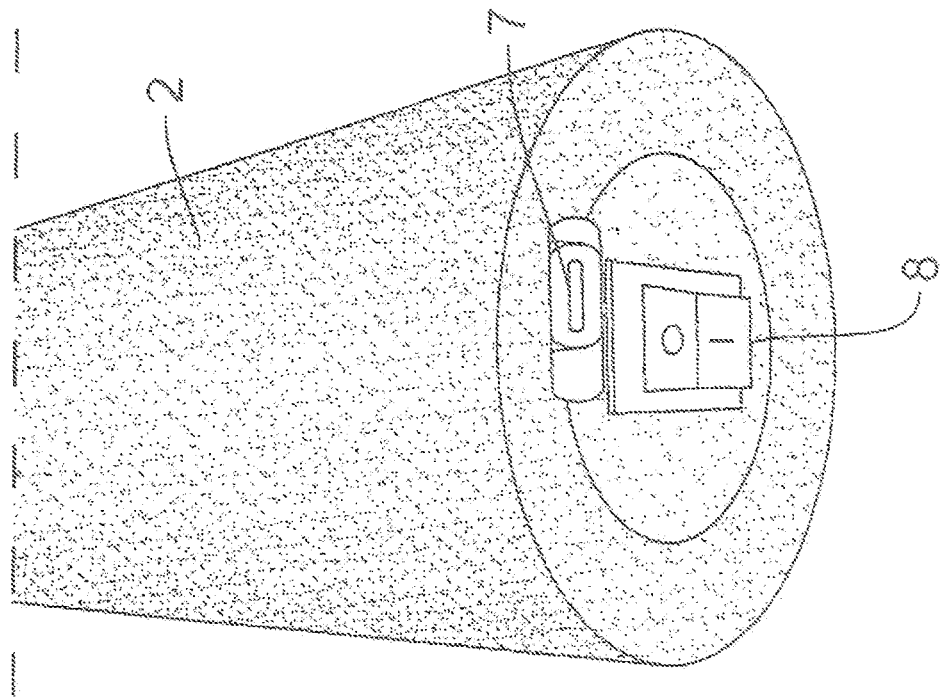
Figure 15:
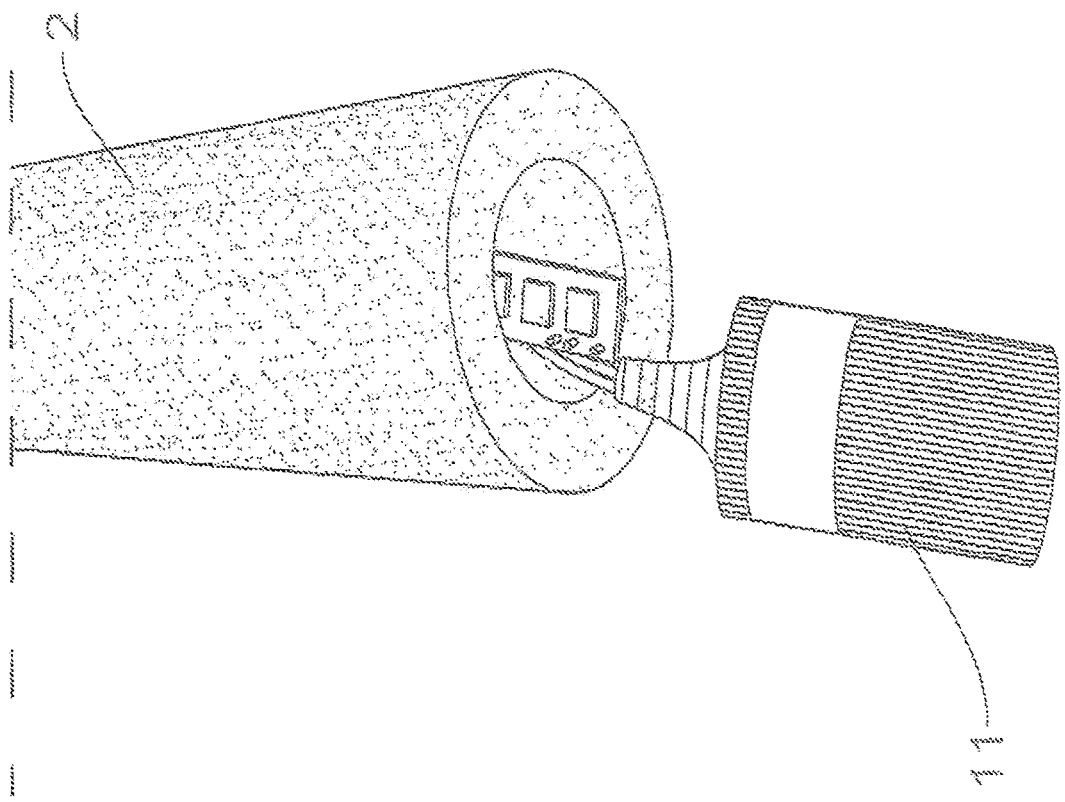
FIGS. 15 and 16 provide, respectively, partially assembled and fully assembled views of the end features of an embodiment of the invention having a female receptacle for connection of the illuminated tubes of the invention in series.
Figure 16:
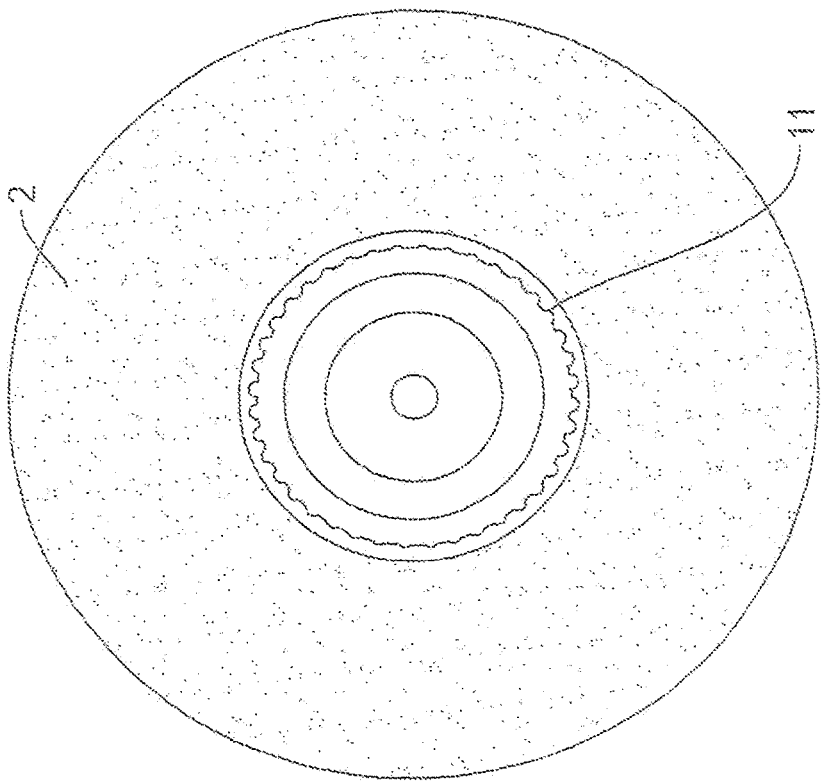

The alternate embodiments illustrated in FIGS. 11, 12, 15 and 16 provide different means for powering and/or connecting the light tubes 2 of the invention. First, FIG. 11 illustrates an internal 12 volt battery pack 6 for use with the invention, and includes both a recharge plug 7 to recharge pack 6 and a switch 8 to turn activate the LED 4B/pack 6 connection to activate the light. FIG. 12 illustrates the end features of this embodiment of the invention containing said battery pack 6. Second, FIGS. 13 through 15 provide, respectively, partially assembled and fully assembled views of the end features f an embodiment of the invention adapted for both connection to an external battery pack and plugging into a standard source of power. As will be noted, his version features a pull-out jack 9 for connection to an interfacing battery pack connector (not shown) in addition to the usual cord/wire 4. Third, FIGS. 5 and 16 provide, respectively, partially assembled and fully assembled views f the end features of an embodiment of the invention having a female receptacle 11 for connection of the illuminated tubes 2 of the invention in series. (Receptacle 11 can advantageously be formed using a marine receptacle with cap 11A). Thus, a series of such embodiments, having male plug 3 at one end and a female receptacle 11 for such a plug 3 at the other end can be connected in series when and as needed.

PARTS LIST

1 Lighting Apparatus
2 Cylindrical foam tube
2A Retainers (suction cups and/or magnets)
2B Retainer straps
3 12-volt plug
4 long wire
4A positive and negative leads
4B diode/LED strip
4C Zip tie anchors
5 foam plug/cap
6 Battery pack
7 Recharge plug
8 Light switch
9 Pull-out jack
10 Automobile window
11A Female plug receptacle
11B Receptacle cap However, numerous variations are possible without deviating from and/or exceeding the spirit and scope of the invention. Moreover, many of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the claims to be filed hereafter.

The invention claimed is:

1. A lighting apparatus for applying window tint in automobiles, comprising:
    an elongate translucent cylindrical foam tube that is soft, flexible, and resilient so as to be bendable at a right angle and form an "L" shape that will conform to and fit adjacent the inside corner of an automobile window;
    an elongate flexible electrically powered internal illumination source positioned within said foam tube, wherein said elongate flexible electrically powered internal illumination source comprises a flexible LED bearing strip the approximate length of said cylindrical foam tube, which strip bears a plurality of LEDs along its length; and
    a source of electrical power for said internal illumination source.

2. The lighting apparatus of claim 1, wherein said source of electrical power comprises an electrical power plug extending from an end of said tube which is one of: connectable to an external source of electric power, connected to at least one battery located outside said foam tube, and adapted for connection to a cigarette lighter socket located within a motor vehicle.

3. The lighting apparatus of claim 2, wherein said apparatus does not incorporate or enclose a light-transmissive diffuser tube and further comprising an electrical socket on an end of the foam tube opposite said electrical power cord, which socket is adapted to receive a plug from an other said lighting apparatus such that the other said lighting apparatus receives its power thereby.

4. The lighting apparatus of claim 3, further comprising a suction cup fastener for affixing the apparatus in position.

5. The lighting apparatus of claim 4, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

6. The lighting apparatus of claim 2, further comprising a suction cup fastener for affixing the apparatus in position.

7. The lighting apparatus of claim 6, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

8. The lighting apparatus of claim 1, further comprising a suction cup fastener for affixing the apparatus in position.

9. The lighting apparatus of claim 8, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

10. A method for applying window tint, comprising:
providing an elongate translucent cylindrical foam tube that is soft, flexible, and resilient with an elongate flexible electrically powered internal illumination source positioned within said foam tube, and a source of electrical power for said internal illumination source; and
positioning said translucent cylindrical foam tube to illuminate an area where window tint material is to be applied.

11. The method of claim 10, wherein positioning said translucent cylindrical foam tube to illuminate an area where window tint material is to be applied includes at least one of:
positioning said tube adjacent an edge where said window tint material will be applied, bending said tube so as to better conform to an edge where said window tint material will be applied, positioning said tube on the interior edge of said window, connecting said internal illumination source to a source of electrical power, connecting said internal illumination source to a source of electrical power provided within the vehicle, and activating said internal illumination source.

12. The method of claim 11, wherein said source of electrical power comprises an electrical power plug extending from an end of said tube which is one of: connectable to an external source of electric power, connected to at least one battery located outside said foam tube, and adapted for connection to a cigarette lighter socket located within a motor vehicle.

13. The method of claim 12, further comprising an electrical socket on an end of the foam tube opposite said electrical power cord, which socket is adapted to receive a plug from an other said lighting apparatus such that the other said lighting apparatus receives its power thereby.

14. The method of claim 13, wherein said elongate flexible electrically powered internal illumination source comprises a flexible LED bearing strip the approximate length of said cylindrical foam tube, which strip bears a plurality of LEDs along its length.

15. The method of claim 14, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

16. The method of claim 12, wherein said elongate flexible electrically powered internal illumination source comprises a flexible LED bearing strip the approximate length of said cylindrical foam tube, which strip bears a plurality of LEDs along its length.

17. The method of claim 16, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

18. The method of claim 11, wherein said elongate flexible electrically powered internal illumination source comprises a flexible LED bearing strip the approximate length of said cylindrical foam tube, which strip bears a plurality of LEDs along its length.

19. The method of claim 18, wherein at least one of a plurality of zip ties are fastened around said flexible LED bearing strip to assist in stabilizing and securing said strip in position within said cylindrical foam tube, and a suction cup or magnet is connected to the exterior of said cylindrical foam tube for use in attaching it to a window and stabilizing it in position.

20. A method for applying window tint, comprising:
providing an elongate translucent cylindrical foam tube that is soft, flexible, and resilient with an elongate flexible electrically powered internal illumination source positioned within said foam tube, and a source of electrical power for said internal illumination source comprising an electrical power cord and plug extending from an end of said tube wherein said plug is adapted for connection to a cigarette lighter socket located within a motor vehicle; and
plugging said plug into a cigarette lighter in said motor vehicle to actuate said illumination source and positioning said translucent cylindrical foam tube on the interior of a vehicle window of said vehicle to illuminate an area where window tint material is to be applied.

* * * * *